United States Patent
Kim

(10) Patent No.: US 10,810,884 B2
(45) Date of Patent: Oct. 20, 2020

(54) APPARATUS AND METHOD FOR MANEUVER PLATOONING OF VEHICLE

(71) Applicants: HYUNDAI MOTOR COMPANY, Seoul (KR); KIA MOTORS CORPORATION, Seoul (KR)

(72) Inventor: Dong Hyuk Kim, Hwaseong-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 384 days.

(21) Appl. No.: 15/829,003

(22) Filed: Dec. 1, 2017

(65) Prior Publication Data

US 2019/0122562 A1 Apr. 25, 2019

(30) Foreign Application Priority Data

Oct. 24, 2017 (KR) .......................... 10-2017-0138587

(51) Int. Cl.
| | | |
|---|---|---|
| G08G 1/00 | (2006.01) |
| F01N 3/023 | (2006.01) |
| F01N 9/00 | (2006.01) |
| F01N 11/00 | (2006.01) |
| G05D 1/02 | (2020.01) |

(52) U.S. Cl.
CPC .............. G08G 1/22 (2013.01); F01N 3/023 (2013.01); F01N 9/002 (2013.01); F01N 11/00 (2013.01); G05D 1/0293 (2013.01); F01N 2900/10 (2013.01)

(58) Field of Classification Search
None
See application file for complete search history.

(56) References Cited

U.S. PATENT DOCUMENTS

| 9,494,944 B2 | 11/2016 | Alam et al. |
| 2010/0256852 A1* | 10/2010 | Mudalige ............... G08G 1/163 701/24 |
| 2015/0013312 A1* | 1/2015 | Gallagher .......... F02M 25/0818 60/274 |
| 2017/0067385 A1* | 3/2017 | Hunt ...................... B60W 50/14 |
| 2017/0158194 A1* | 6/2017 | Leisenring ............ F02D 41/029 |
| 2018/0348791 A1* | 12/2018 | Hendrickson ........ G05D 1/0027 |

FOREIGN PATENT DOCUMENTS

| KR | 20170037681 A | 4/2017 |
| WO | WO2013147684 A1 | 10/2013 |
| WO | WO2015156731 A1 | 10/2015 |
| WO | WO2016182489 A1 | 11/2016 |

* cited by examiner

*Primary Examiner* — Nicholas K Wiltey
(74) *Attorney, Agent, or Firm* — Brinks Gilson & Lione

(57) ABSTRACT

The present disclosure provides an apparatus and method for maneuver platooning of a vehicle. The apparatus may include a communication circuit that communicates with one or more external vehicles included in a vehicle platooning group together with the vehicle, a filter that filters particulate matter generated by the vehicle, and a controller electrically connected with the communication circuit. The controller is configured to control at least one of a behavior of the vehicle or a regeneration of the filter based on information about an order of the vehicle in the vehicle platooning group, when the controller determines that regenerating the filter is required.

18 Claims, 9 Drawing Sheets

APPARATUS AND METHOD FOR MANEUVER PLATOONING OF VEHICLE

CROSS-REFERENCE TO RELATED APPLICATION

The present application claims priority to and the benefit of Korean Patent Application No. 10-2017-0138587, filed on Oct. 24, 2017, which is incorporated herein by reference in its entirety.

FIELD

The present disclosure relates to an apparatus and method for regenerating a filter during vehicle platooning of a plurality of vehicles.

BACKGROUND

The statements in this section merely provide background information related to the present disclosure and may not constitute prior art.

Driving a vehicle engine may involve the emission of exhaust gases, including CO, particulate matter (PM), HC, $NO_x$, and the like, which may cause air pollution. To reduce air pollution caused by exhaust gases, it has recently become mandatory for a vehicle to have an exhaust gas reduction apparatus. A filter, such as a diesel particulate filter (DPF) for reducing PM emissions, may be regenerated in the case where the amount of soot in the filter increases. When the filter is regenerated, the temperature of exhaust gases may increase and the idle RPM of a vehicle may increase (e.g., from about 500 RPM to about 1000 RPM).

SUMMARY

In recent years, vehicle platooning technology by which a plurality of vehicles arranged in a line at a specified interval autonomously travel has been developed. When one of vehicles included in a vehicle platooning group performs an operation of regenerating a filter that filters particulate matter (PM), a vehicle following behind the corresponding vehicle may be damaged by high-temperature exhaust gases. Furthermore, since the revolutions per minute (RPM) of each vehicle increases, the accuracy of RPM-based control may be reduced.

An aspect of the present disclosure provides an apparatus and method for effectively regenerating a filter during vehicle platooning.

In one aspect of the present disclosure, an apparatus for maneuver platooning of a vehicle includes a communication circuit that communicates with one or more external vehicles included in a vehicle platooning group together with the vehicle, a filter that filters particulate matter generated by the vehicle, and a controller electrically connected with the communication circuit. The controller may be configured to control at least one of a behavior of the vehicle or a regeneration of the filter based on information about an order of the vehicle in the vehicle platooning group when the controller determines that regenerating the filter is required.

The filter may be a diesel particulate filter (DPF).

The controller may be configured to determine whether to regenerate the filter based on an amount of soot in the filter.

The apparatus may further include an engine electrically connected with the controller, and the controller may be configured to regenerate the filter by increasing temperature in the filter by using the engine.

The controller may be configured to obtain information regarding a remaining distance to a destination of the vehicle platooning group when the controller determines that regenerating the filter is required, and the controller may be configured to regenerate the filter after the vehicle reaches the destination of the vehicle platooning group when the remaining distance to the destination of the vehicle platooning group is shorter than a specified value.

The controller may be configured to notify, with the communication circuit, other vehicles in the vehicle platooning group of the regeneration of the filter when the controller determines that regenerating the filter is required. The controller may be configured to control the behavior of the vehicle or a behavior of an external vehicle to increase a distance between the vehicle and the external vehicle, wherein the external vehicle is a vehicle driving behind the vehicle, and may be configured to regenerate the filter when the other vehicles in the vehicle platooning group approve the regeneration of the filter.

The controller may be configured to notify, with the communication circuit, the external vehicle of the regeneration of the filter when the controller determines regenerating the filter is required and the vehicle is a leading vehicle in the vehicle platooning group. The controller may be configured to regenerate the filter when the external vehicle approves the regeneration of the filter.

The controller may be configured to control the behavior of the vehicle or the behavior of the external vehicle to increase the distance between the vehicle and the external vehicle when the external vehicle approves the regeneration of the filter.

The controller may be configured to disable the vehicle platooning group when the external vehicle does not approve the regeneration of the filter.

The controller may be configured to notify, with the communication circuit, the other vehicles in the vehicle platooning group of the regeneration of the filter when the controller determines that regenerating the filter is required. The controller may control the behavior of the vehicle such that the vehicle moves to a rear of the vehicle platooning group and may be configured to regenerate the filter when the other vehicles in the vehicle platooning group approve the regeneration of the filter.

The controller may be configured to notify, with the communication circuit, the other vehicles in the vehicle platooning group of the regeneration of the filter when the controller determines that regenerating the filter is required and the vehicle is not the leading vehicle in the vehicle platooning group. The controller may be configured to control the behavior of the vehicle such that the vehicle moves to the rear of the vehicle platooning group and may be configured to regenerate the filter when the leading vehicle approves the regeneration of the filter.

The controller may be configured to disable the vehicle platooning group when the leading vehicle does not approve the regeneration of the filter.

The controller may be configured to regenerate the filter when the controller determines that regenerating the filter is required and the vehicle is a trailing vehicle in the vehicle platooning group.

In another aspect of the present disclosure, a method for maneuver platooning of a vehicle includes starting vehicle platooning of a vehicle platooning group including the vehicle, determining whether to regenerate a filter included in the vehicle, and controlling at least one of a behavior of the vehicle or a regeneration of the filter based on information regarding an order of the vehicle in the vehicle platooning group when it is determined that regenerating the filter is required.

Determining whether to regenerate the filter may include determining whether to regenerate the filter, based on an amount of soot in the filter.

Controlling at least one of the behavior of the vehicle or the regeneration of the filter may include regenerating the filter by increasing temperature in the filter.

Controlling at least one of the behavior of the vehicle or the regeneration of the filter may include obtaining information regarding a remaining distance to a destination of the vehicle platooning group when it is determined that regenerating the filter is required, and regenerating the filter after the vehicle reaches the destination of the vehicle platooning group when the remaining distance to the destination of the vehicle platooning group is shorter than a specified value.

Controlling at least one of the behavior of the vehicle or the regeneration of the filter may include: notifying other vehicles in the vehicle platooning group of the regeneration of the filter when it is determined that regenerating the filter is required, controlling the behavior of the vehicle or a behavior of an external vehicle following closely behind the vehicle to increase a distance between the vehicle and the external vehicle when the other vehicles in the vehicle platooning group approve the regeneration of the filter, and regenerating the filter.

Controlling at least one of the behavior of the vehicle or the regeneration of the filter may include: notifying the other vehicles in the vehicle platooning group of the regeneration of the filter when it is determined that regenerating the filter is required, controlling the behavior of the vehicle such that the vehicle moves to a rear of the vehicle platooning group when the other vehicles in the vehicle platooning group approve the regeneration of the filter, and regenerating the filter.

Controlling at least one of the behavior of the vehicle or the regeneration of the filter may include: regenerating the filter when it is determined that regenerating the filter is required and the vehicle is a trailing vehicle in the vehicle platooning group.

The apparatus for maneuver platooning of a vehicle, in some forms of the present disclosure, may regenerate a filter after performing appropriate control according to the order of the vehicle in a vehicle platooning group, which may reduce heat damage to neighboring vehicles and enhance the accuracy of vehicle platooning control.

In addition, the present disclosure may provide various effects that may be directly or indirectly recognized.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
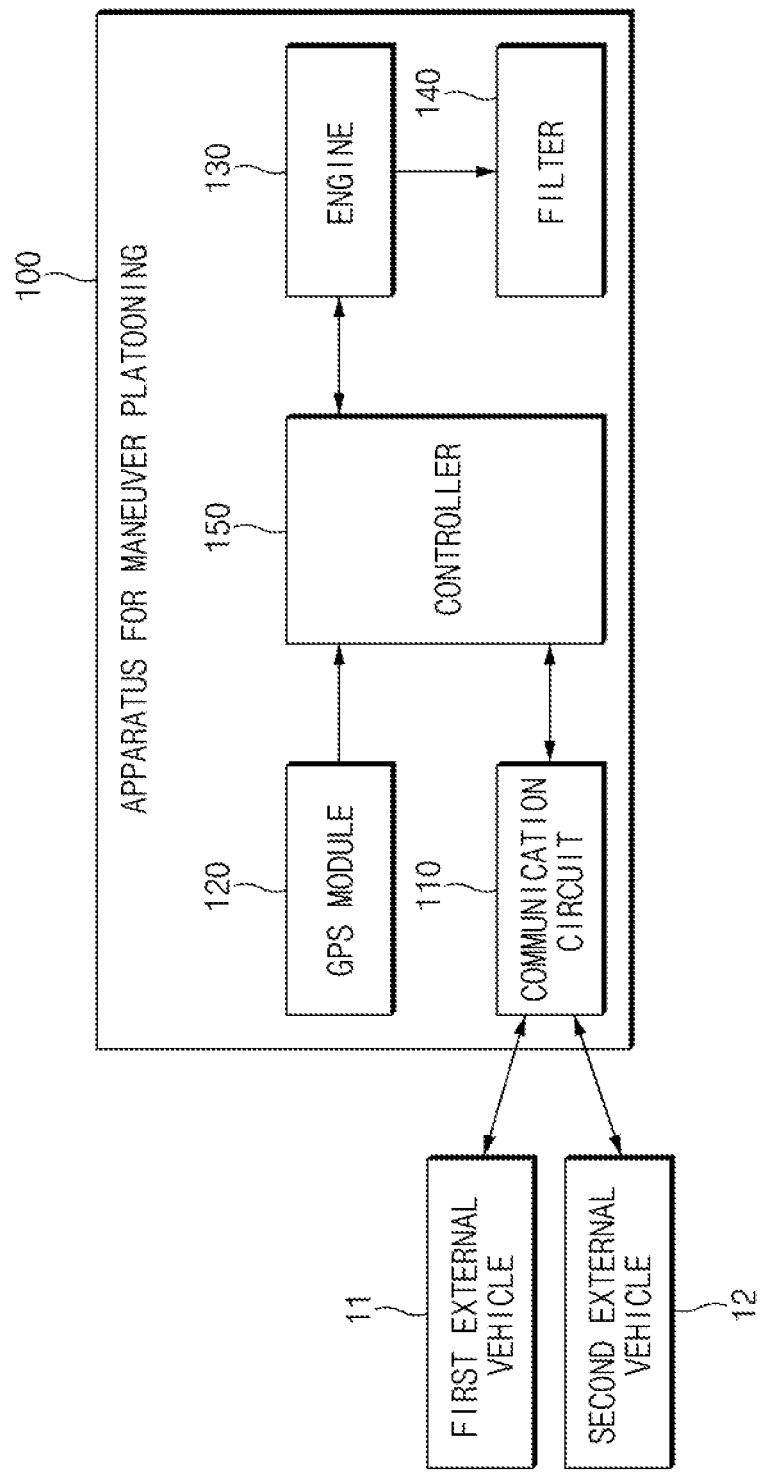
FIG. 1 is a block diagram illustrating a configuration of an apparatus for maneuver platooning of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for maneuver platooning of a vehicle, in some forms of the present disclosure.

Referring to FIG. 1, an apparatus 100 for maneuver platooning in some forms of the present disclosure (hereinafter, referred to as the apparatus 100 for the convenience of description) may include a communication circuit 110, a GPS module 120, an engine 130, a filter 140, and a controller 150. The apparatus 100 may be a system mounted in a vehicle.

The communication circuit 110 may be configured to communicate with an external vehicle. In some forms of the present disclosure, the communication circuit 110 may communicate with one or more external vehicles (e.g., a first external vehicle 11 and a second external vehicle 12) that are included in a vehicle platooning group together with the vehicle including the apparatus 100.

The GPS module 120 may receive a signal for locating the apparatus 100 from a satellite. The apparatus 100 may obtain information about the current position of the vehicle on the basis of the signal received by the GPS module 120.

The engine 130 may combust fuel to generate power for the vehicle's behavior. The engine 130 may include a separate controller. In some forms of the present disclosure, the engine 130 may monitor the amount of soot in the filter

140. The engine 130 may supply fuel to the filter 140 and may increase the temperature of the filter 140 to combust the soot in the filter 140, thereby regenerating the filter 140.

The filter 140 may be configured to filter particulate matter (PM) generated by the vehicle. The filter 140 may be, for example, a diesel particulate filter (DPF).

The controller 150 may be electrically connected with the communication circuit 110, the GPS module 120, and the engine 130. The controller 150 may control the communication circuit 110, the GPS module 120, and the engine 130 and may process and compute a variety of data.

In some forms of the present disclosure, the controller 150 may perform vehicle platooning on the group that includes the vehicle having the apparatus 100 mounted therein. The controller 150 may regenerate the filter 140 by using the following method during the vehicle platooning if necessary.

In some forms of the present disclosure, the controller 150 may determine whether it is necessary to regenerate the filter 140 during the vehicle platooning. For example, the controller 150 may obtain information about the amount of soot in the filter 140 by using the engine 130. The controller 150 may determine whether it is necessary to regenerate the filter 140, based on the amount of soot in the filter 140. For example, if the amount of soot in the filter 140 is greater than a specified value, the controller 150 may determine that it is necessary to regenerate the filter 140.

In some forms of the present disclosure, if the controller 150 determines that it is necessary to regenerate the filter 140 during the vehicle platooning, the controller 150 may control at least one of the vehicle's behavior and a regeneration operation for the filter 140 on the basis of information about the remaining distance to a destination of the vehicle platooning or information about the order of the vehicle in the vehicle platooning group. The controller 150 may control the vehicle's behavior and/or the regeneration operation for the filter 140 according to the order of the vehicle in the vehicle platooning group.

Although not illustrated in FIG. 1, the apparatus 100 may further include a radar, a camera, an input unit, a lamp drive unit, a brake unit, and the like and may control the vehicle's behavior by using the radar, the camera, the input unit, the lamp drive unit, the brake unit, and the engine 130.

In some forms of the present disclosure, the controller 150 may regenerate the filter 140 by increasing temperature in the filter 140 by using the engine 130. For example, the controller 150 may control the engine 130 to supply fuel to the filter 140 and increase exhaust heat to raise the temperature of the filter 140, thereby combusting soot in the filter 140.

In some forms of the present disclosure, if the controller 150 determines that it is necessary to regenerate the filter 140, the controller 150 may obtain information about the remaining distance to the destination of the vehicle platooning, and if the remaining distance is shorter than a specified value, the controller 150 may regenerate the filter 140 after the vehicle reaches the destination. For example, the controller 150 may obtain information about the current position of the vehicle by using the GPS module 120 and may obtain information about the distance between the current position and the destination. In the case where the remaining distance is shorter than the specified value, the filter 140 may be regenerated after the vehicle arrives at the destination. Accordingly, the controller 150 may delay regenerating the filter 140.

In some forms of the present disclosure, in the case where it is necessary to regenerate the filter 140, the controller 150 may control behavior of the vehicle or an external vehicle following closely behind the vehicle to increase the distance between the vehicle and the external vehicle. For example, if the controller 150 determines that it is necessary to regenerate the filter 140, the controller 150 may communicate a regeneration operation for the filter 140 to at least some other vehicles in the vehicle platooning group by using the communication circuit 110, and if at least some other vehicles in the vehicle platooning group approve the regeneration operation for the filter 140, the controller 150 may control behavior of the vehicle or behavior of the external vehicle following closely behind the vehicle to increase the distance between the vehicle and the external vehicle, and may regenerate the filter 140. Since the distance between the vehicle to regenerate the filter 140 and the external vehicle following closely behind the vehicle increases, the external vehicle may be prevented from being thermally damaged by emissions of the vehicle.

In some forms of the present disclosure, if the controller 150 determines that it is necessary to regenerate the filter 140 and the vehicle is a leading vehicle in the vehicle platooning group, the controller 150 may communicate a regeneration operation for the filter 140 to an external vehicle following closely behind the vehicle, among the vehicles in the vehicle platooning group, by using the communication circuit 110, and if the external vehicle approves the regeneration operation for the filter 140, the controller 150 may control behavior of the vehicle or behavior of the external vehicle to increase the distance between the vehicle and the external vehicle, and may regenerate the filter 140. If the external vehicle does not approve the regeneration operation for the filter 140, the controller 150 may disable the vehicle platooning.

In some forms of the present disclosure, in the case where it is necessary to regenerate the filter 140, the controller 150 may control the vehicle's behavior to move the vehicle to the rear of the vehicle platooning group. For example, if the controller 150 determines that it is necessary to regenerate the filter 140, the controller 150 may communicate a regeneration operation for the filter 140 to at least some other vehicles in the vehicle platooning group by using the communication circuit 110, and if at least some other vehicles in the vehicle platooning group approve the regeneration operation for the filter 140, the controller 150 may control the vehicle's behavior to move the vehicle to the rear of the vehicle platooning group, and may regenerate the filter 140. Since there is no external vehicle behind the vehicle to regenerate the filter 140, an external vehicle may be prevented from being thermally damaged by emissions of the vehicle.

In some forms of the present disclosure, if the controller 150 determines that it is necessary to regenerate the filter 140 and the vehicle is not the leading vehicle in the vehicle platooning group, the controller 150 may communicate a regeneration operation for the filter 140 to other vehicles in the vehicle platooning group by using the communication circuit 110, and if the leading vehicle approves the regeneration operation for the filter 140, the controller 150 may control the vehicle's behavior to move the vehicle to the rear of the vehicle platooning group, and may regenerate the filter 140. If the leading vehicle does not approve the regeneration operation for the filter 140, the controller 150 may disable the vehicle platooning.

In some forms of the present disclosure, if the controller 150 determines that it is necessary to regenerate the filter 140 and the vehicle is a trailing vehicle in the vehicle platooning group, the controller 150 may immediately regenerate the filter 140. In the case where the vehicle is located at the rear of the vehicle platooning group, the vehicle may not cause heat damage to an external vehicle even if the controller 150 regenerates the filter 140. Accordingly, the filter 140 may be regenerated as it is.

Figure 2:
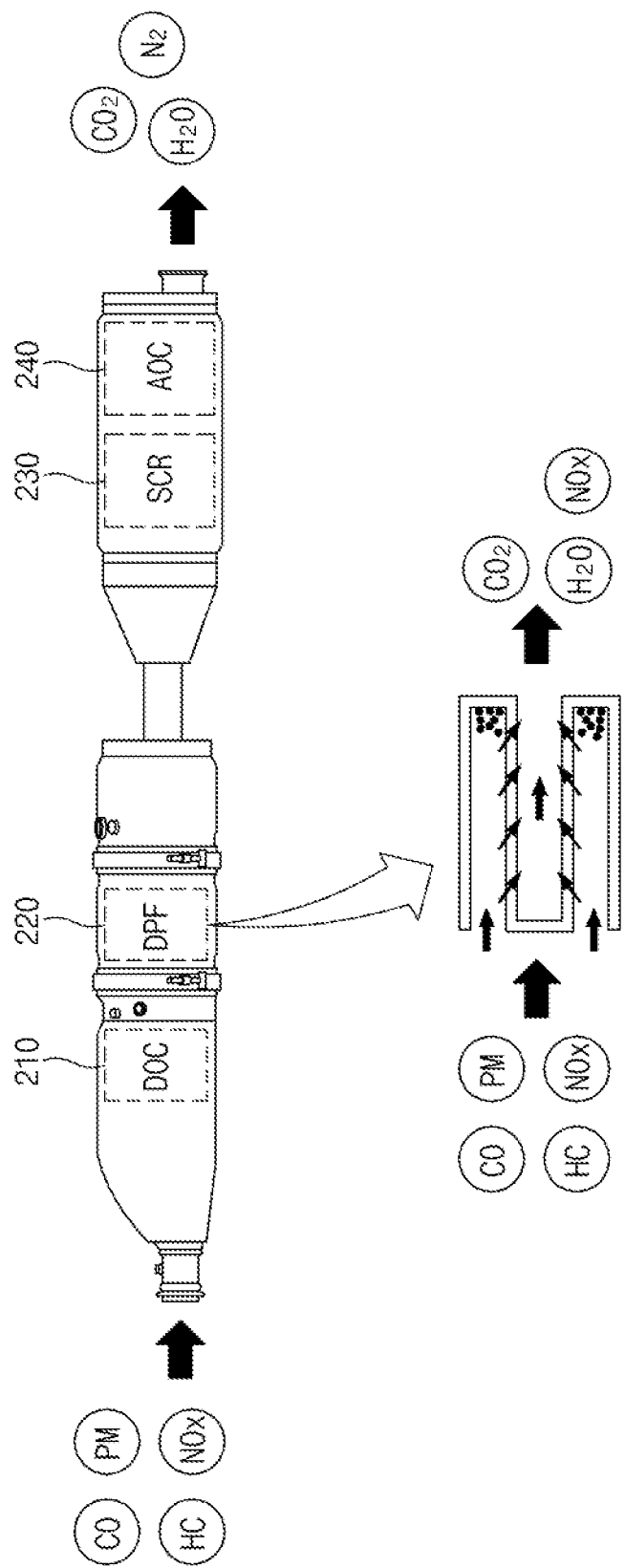
FIG. 2 illustrates a module included in a vehicle to purify emissions.

FIG. 2 illustrates a module included in a vehicle to purify emissions, in some forms of the present disclosure.

Referring to FIG. 2, a vehicle in some forms of the present disclosure may include a diesel oxidation catalyst (DOC) 210, a diesel particulate filter (DPF) 220, a selective catalytic reduction (SCR) 230, and an ammonia oxidation catalyst (AOC) 240. For example, the vehicle may purify CO, PM, HC, NOR, and the like by using the DOC 210, the DPF 220, the SCR 230, the AOC 240, and the like and may discharge $CO_2$, $H_2O$, and $N_2$. Especially, the DPF 220 may filter PM included in emissions. The PM filtered by the DPF 220 may be accumulated in the DPF 220. If the PM is accumulated in the DPF 220, the vehicle may raise the temperature of exhaust heat to the ignition temperature of the PM or higher (e.g., about 550° C. to about 650° C.) to remove the PM.

Figure 3:
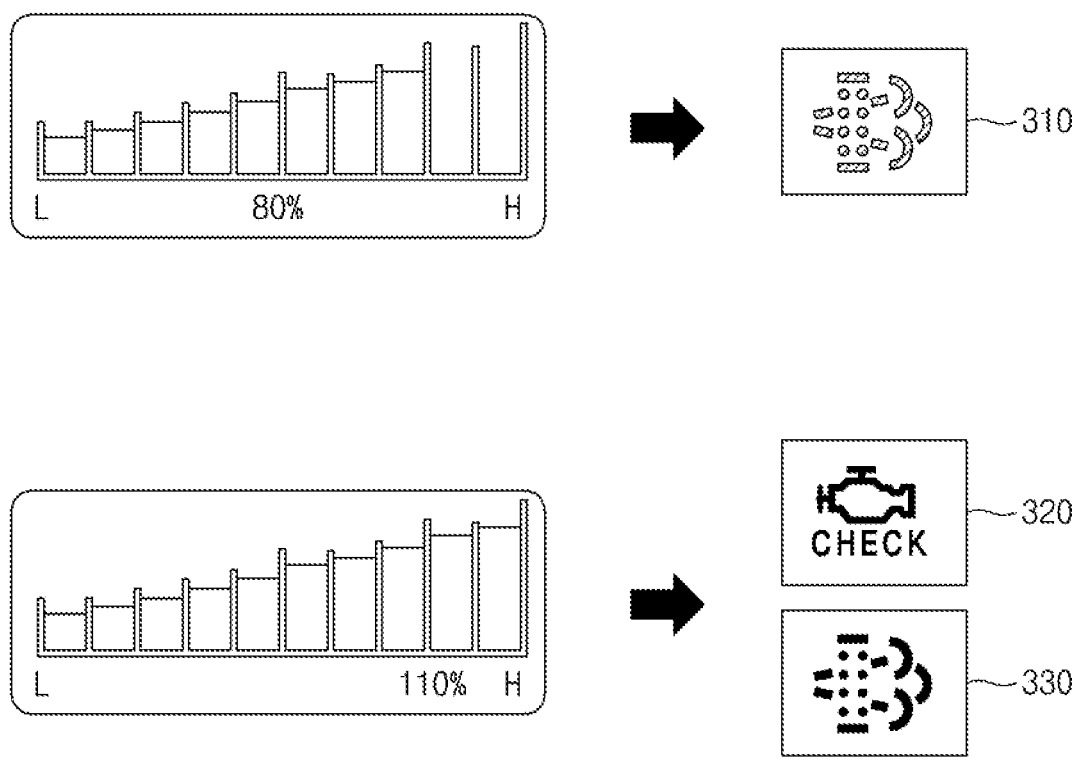
FIG. 3 illustrates an exemplary user interface provided by a vehicle.

FIG. 3 illustrates an exemplary user interface provided by a vehicle, in some forms of the present disclosure.

Referring to FIG. 3, a vehicle in some forms of the present disclosure may include a display that outputs various pieces of information. For example, the vehicle may display a gauge that indicates the amount of soot in a filter. In the case where the amount of soot exceeds a specified value (e.g., 80%), the vehicle may automatically perform an operation of regenerating the filter and may allow a filter regeneration indicator light to turn green (see reference number 310 of FIG. 3) to notify that the filter is being regenerated. In the case where it is impossible to regenerate the filter on account of an excessive amount of soot, the vehicle may allow the filter regeneration indicator light to turn red (see reference number 330 of FIG. 3) and may allow an engine check light to turn red (see reference number 320 of FIG. 3).

Figure 4:
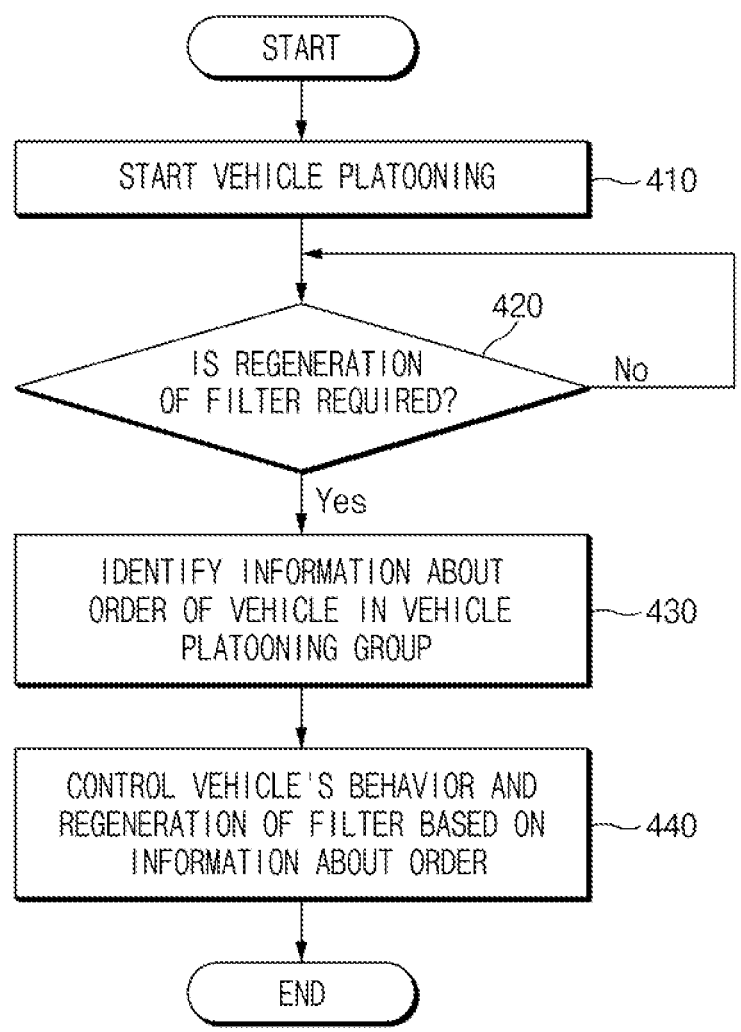
FIG. 4 is a flowchart illustrating a method for maneuver platooning of a vehicle.

FIG. 4 is a flowchart illustrating a method for maneuver platooning of a vehicle, in some forms of the present disclosure.

Hereinafter, it is assumed that the apparatus 100 of FIG. 1 performs the process illustrated in FIG. 4. Furthermore, it may be understood that operations mentioned as being performed by the apparatus in the description of FIG. 4 are controlled by the controller 150 of the apparatus 100.

Referring to FIG. 4, in step 410, the apparatus may start vehicle platooning. For example, the apparatus may start vehicle platooning for a vehicle platooning group that includes a vehicle in which the apparatus is mounted.

In step 420, the apparatus may determine whether it is necessary to regenerate a filter. For example, the apparatus may monitor the amount of soot in the filter, and if the amount of soot exceeds a specified value, the apparatus may determine that it is necessary to regenerate the filter.

In the case where it is necessary to regenerate the filter, the apparatus may, in step 430, identify information about the order of the vehicle in the vehicle platooning group. For example, the apparatus may identify the vehicle ID assigned to the vehicle in the vehicle platooning. The vehicle ID may represent where the vehicle is located in the vehicle platooning group.

In step 440, the apparatus may control the vehicle's behavior and/or an operation of regenerating the filter, based on the information about the order. For example, the apparatus may control the vehicle's behavior according to the order of the vehicle and may control the regeneration of the filter so as not to cause heat damage to external vehicles and degrade control performance while the filter is being regenerated. A specific control method according to the order of the vehicle will be described below in detail with reference to FIG. 5.

Figure 5:
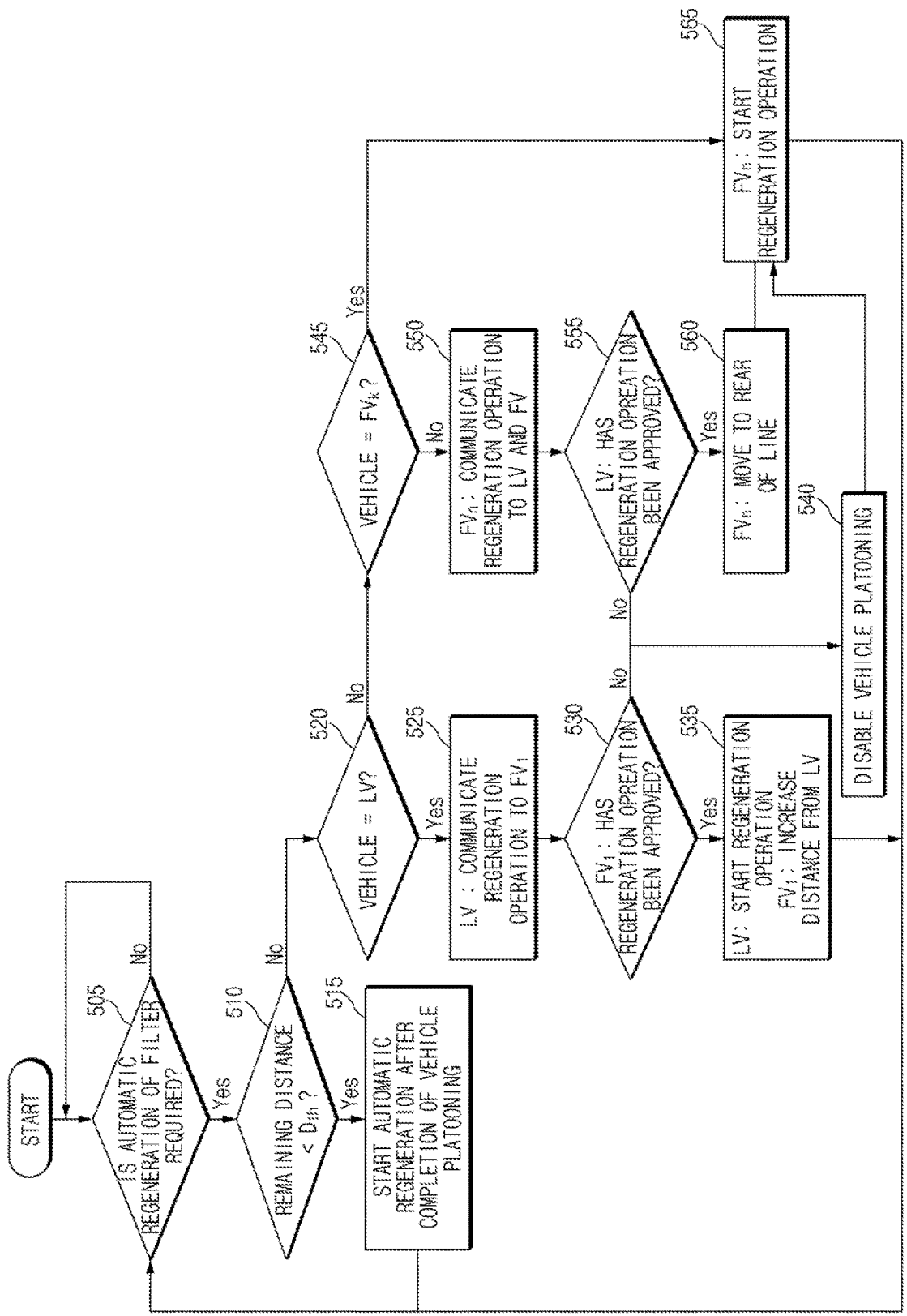
FIG. 5 is a flowchart illustrating a method for maneuver platooning of a vehicle.

FIG. 5 is a flowchart illustrating a method for maneuver platooning of a vehicle, in some forms of the present disclosure.

Hereinafter, it is assumed that the apparatus 100 of FIG. 1 performs the process illustrated in FIG. 5. Furthermore, it may be understood that operations mentioned as being performed by the apparatus in the description of FIG. 5 are controlled by the controller 150 of the apparatus 100.

In step 505, the apparatus may determine whether automatic regeneration of a filter is necessary. For example, the apparatus may monitor the amount of soot in the filter, and if the amount of soot exceeds a specified value, the apparatus may determine that it is necessary to regenerate the filter.

In step 510, the apparatus may determine whether the remaining distance to a destination of the vehicle platooning is shorter than a specified value $D_{th}$. For example, the apparatus may obtain information about the current position of the vehicle, calculate the remaining distance from the current position to the destination, and determine whether the remaining distance is shorter than the specified value.

In the case where the remaining distance is shorter than the specified value, the apparatus may, in step 515, start the automatic regeneration after the vehicle platooning is completed. For example, if the remaining distance is shorter than the specified value, the filter may be regenerated after the vehicle arrives at the destination. Accordingly, the apparatus may regenerate the filter after the vehicle reaches the destination so that the vehicle platooning is completed.

In the case where the remaining distance is longer than the specified value, the apparatus may, in step 520, determine whether the vehicle is a leading vehicle LV. For example, the apparatus may identify the ID assigned to the vehicle in the vehicle platooning to determine whether the vehicle is the leading vehicle.

In the case where the vehicle is the leading vehicle, the apparatus may, in step 525, communicate a regeneration operation to an external vehicle $FV_1$ following closely behind the vehicle LV. For example, the apparatus may communicate the regeneration operation to an external vehicle that may be directly affected by the regeneration of the filter in the vehicle.

In step 530, the apparatus may determine whether the regeneration operation has been approved by the external vehicle $FV_1$. For example, the external vehicle may receive a message to inquire whether to approve the regeneration operation in response to the communication, and the apparatus may receive, from the external vehicle, a message to approve the regeneration operation.

If the regeneration operation has been approved, the apparatus may, in step 535, control the vehicle LV to start the regeneration operation and may control the external vehicle $FV_1$ to increase the distance between the external vehicle $FV_1$ and the vehicle LV. For example, if the leading vehicle moves to the rear of the vehicle platooning line, it may be difficult to control the vehicle platooning, and therefore the vehicle may increase the distance between the vehicle and the external vehicle to reduce an influence caused by the regeneration operation. After approving the regeneration operation, the external vehicle may perform control to increase the distance from the leading vehicle by itself.

If the regeneration operation has not been approved, the apparatus may, in step 540, disable the vehicle platooning. For example, the apparatus may disable the vehicle platooning and then may, in step 565, regenerate the filter.

In the case where the vehicle is not the leading vehicle, the apparatus may, in step 545, determine whether the vehicle is a trailing vehicle $FV_k$ in the vehicle platooning group. For example, the apparatus may identify the ID assigned to the vehicle in the vehicle platooning to determine whether the vehicle is located at the rear of the vehicle platooning line.

In the case where the vehicle is not the trailing vehicle, the vehicle $FV_n$ may, in step 550, communicate a regeneration operation to the other vehicles LV and FV. For example, the vehicle may communicate the regeneration operation to all the other vehicles included in the vehicle platooning group or may communicate the regeneration operation to some of the vehicles.

In step 555, the apparatus may determine whether the regeneration operation has been approved by the leading vehicle LV. For example, the leading vehicle may receive a message to inquire whether to approve the regeneration operation in response to the communication, and the apparatus may receive, from the leading vehicle, a message to approve the regeneration operation.

In step 560, the apparatus may control the vehicle $FV_n$ to move to the rear of the vehicle platooning line. For example, the apparatus may control the vehicle $FV_n$ to separate from the line and then enter the rear of the line again.

In the case where step 560 has been performed, or in the case where the vehicle is the trailing vehicle, the vehicle $FV_n$ may, in step 565, start regenerating the filter. For example, if the vehicle is located at the rear of the vehicle platooning line, an influence of the filter regeneration on the other vehicles may be reduced. Accordingly, the vehicle may start regenerating the filter at the rear of the vehicle platooning line.

Hereinafter, exemplary behavior of platooning vehicles according to the above-described method will be described in detail with reference to FIGS. 6 to 8.

Figure 6:
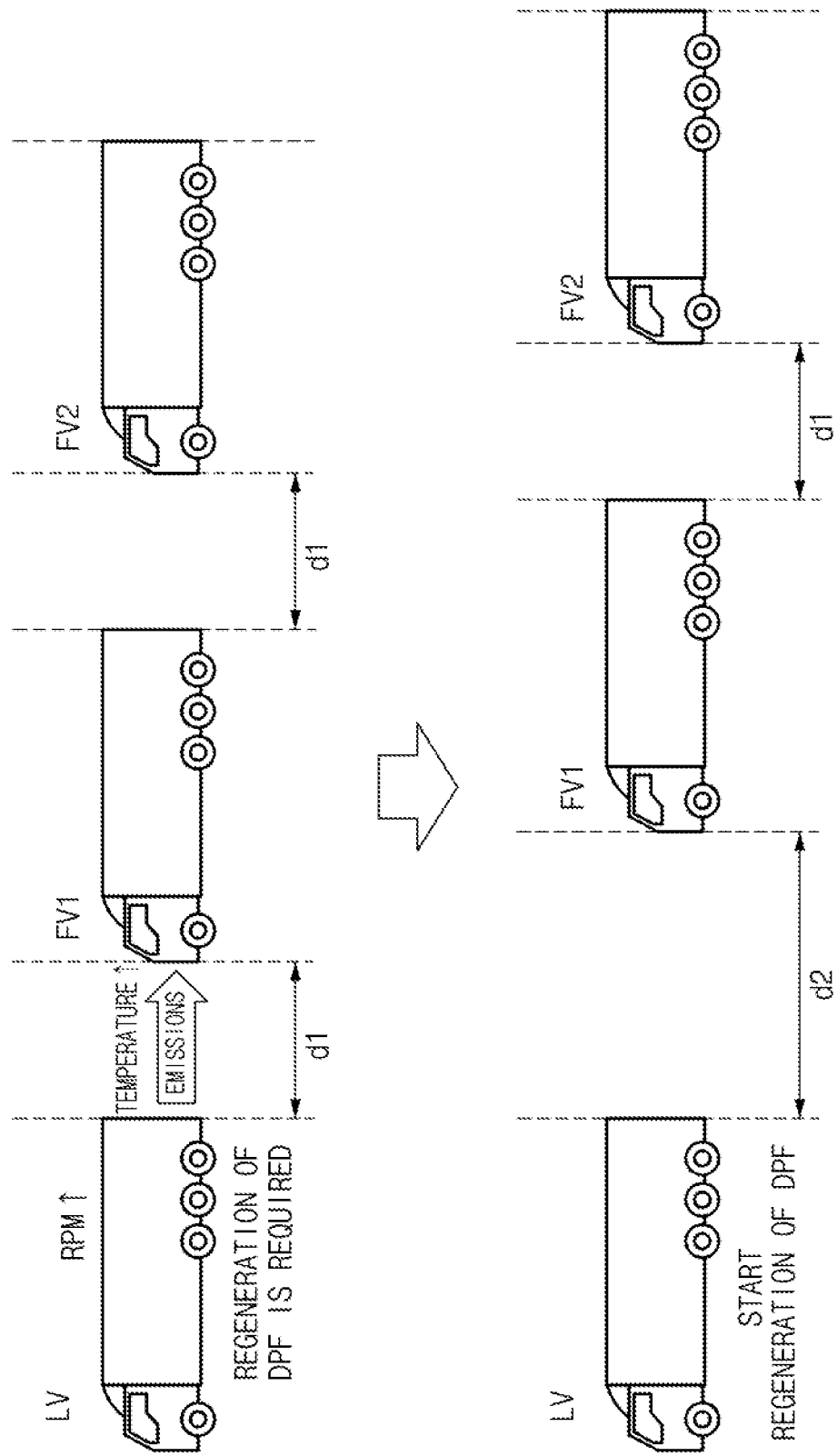
FIG. 6 illustrates exemplary behavior of a vehicle.

FIG. 6 illustrates exemplary behavior of a vehicle, in some forms of the present disclosure.

Referring to FIG. 6, a first vehicle LV, a second vehicle FV1, and a third vehicle FV2 may perform vehicle platooning. During the vehicle platooning, the first vehicle LV, the second vehicle FV1, and the third vehicle FV2 may maintain the vehicle-to-vehicle distance at a first interval d1. During the vehicle platooning, the amount of soot in the first vehicle LV may increase, and therefore it may be required to regenerate a DPF in the first vehicle LV. If the regeneration of the DPF in the first vehicle LV starts during the vehicle platooning, the temperature of emissions may increase, which causes heat damage to the second vehicle FV1, and the RPM may increase, which leads to degradation in the RPM-based control performance of the second vehicle FV1 and the third vehicle FV2. To solve these problems, the first vehicle LV may change the distance between the first vehicle LV and the second vehicle FV1 to a second interval d2.

Figure 7:
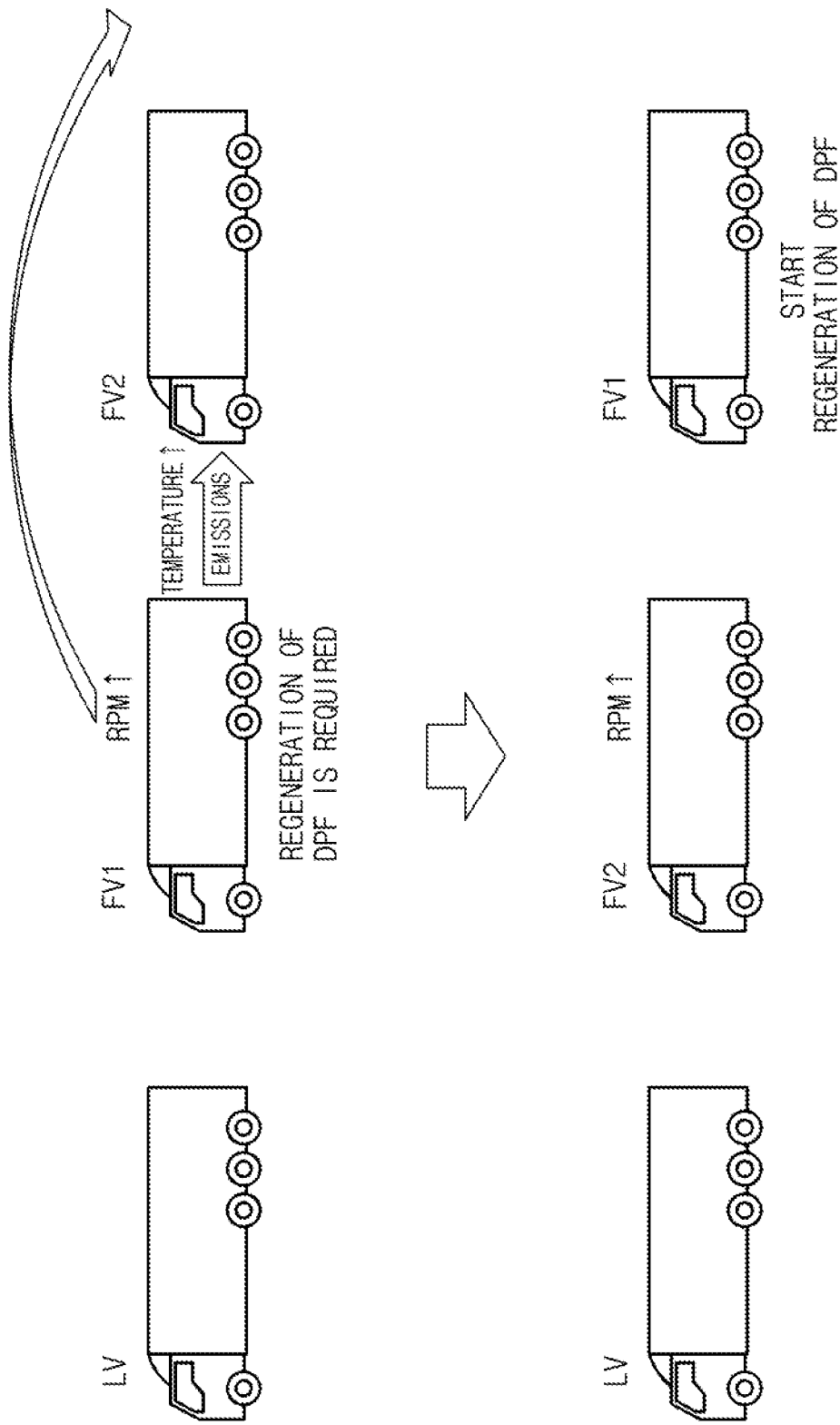
FIG. 7 illustrates exemplary behavior of a vehicle.

FIG. 7 illustrates exemplary behavior of a vehicle, in some forms of the present disclosure.

Referring to FIG. 7, the first vehicle LV, the second vehicle FV1, and the third vehicle FV2 may perform vehicle platooning. During the vehicle platooning, the first vehicle LV, the second vehicle FV1, and the third vehicle FV2 may maintain the vehicle-to-vehicle distance at a specified interval. During the vehicle platooning, the amount of soot in the second vehicle FV1 may increase, and therefore it may be required to regenerate a DPF in the second vehicle FV1. If the regeneration of the DPF in the second vehicle FV1 starts during the vehicle platooning, the temperature of emissions may increase, which causes heat damage to the third vehicle FV2, and the RPM may increase, which leads to degradation in the RPM-based control performance of the first vehicle LV and the third vehicle FV2. To solve these problems, the second vehicle FV1 may move to the rear of the vehicle platooning line, that is, behind the third vehicle FV2.

Figure 8:
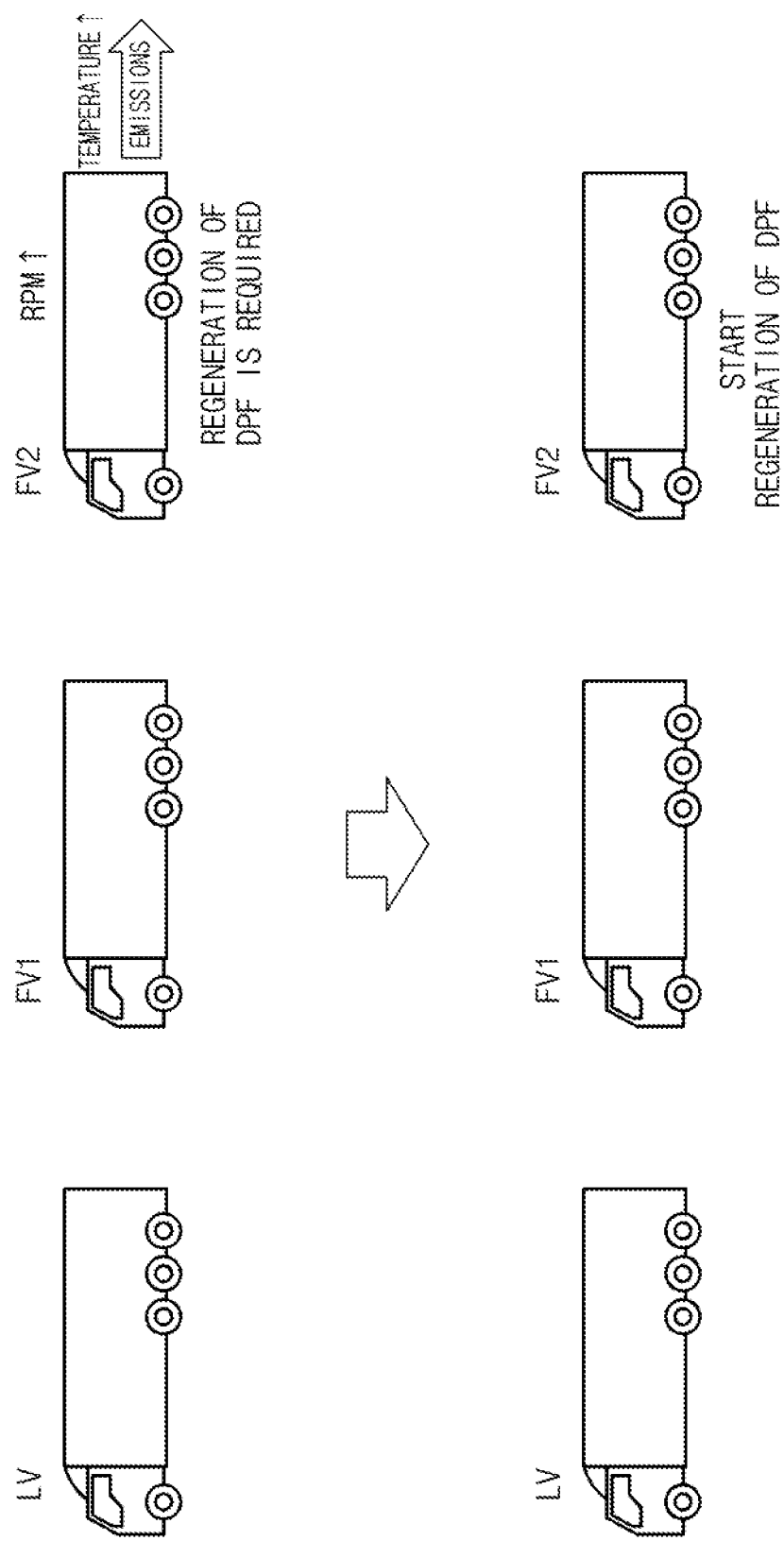
FIG. 8 illustrates exemplary behavior of a vehicle.

FIG. 8 illustrates exemplary behavior of a vehicle, in some forms of the present disclosure.

Referring to FIG. 8, the first vehicle LV, the second vehicle FV1, and the third vehicle FV2 may perform vehicle platooning. During the vehicle platooning, the first vehicle LV, the second vehicle FV1, and the third vehicle FV2 may maintain the vehicle-to-vehicle distance at a specified interval. During the vehicle platooning, the amount of soot in the third vehicle FV2 may increase, and therefore it may be required to regenerate a DPF in the third vehicle FV2. Even though the regeneration of the DPF in the third vehicle FV2 starts during the vehicle plantooning, a negative influence on the first vehicle LV and the second vehicle FV1 may be limited. Accordingly, the third vehicle FV2 may start regenerating the DPF without separately controlling behavior of the third vehicle FV2.

Figure 9:
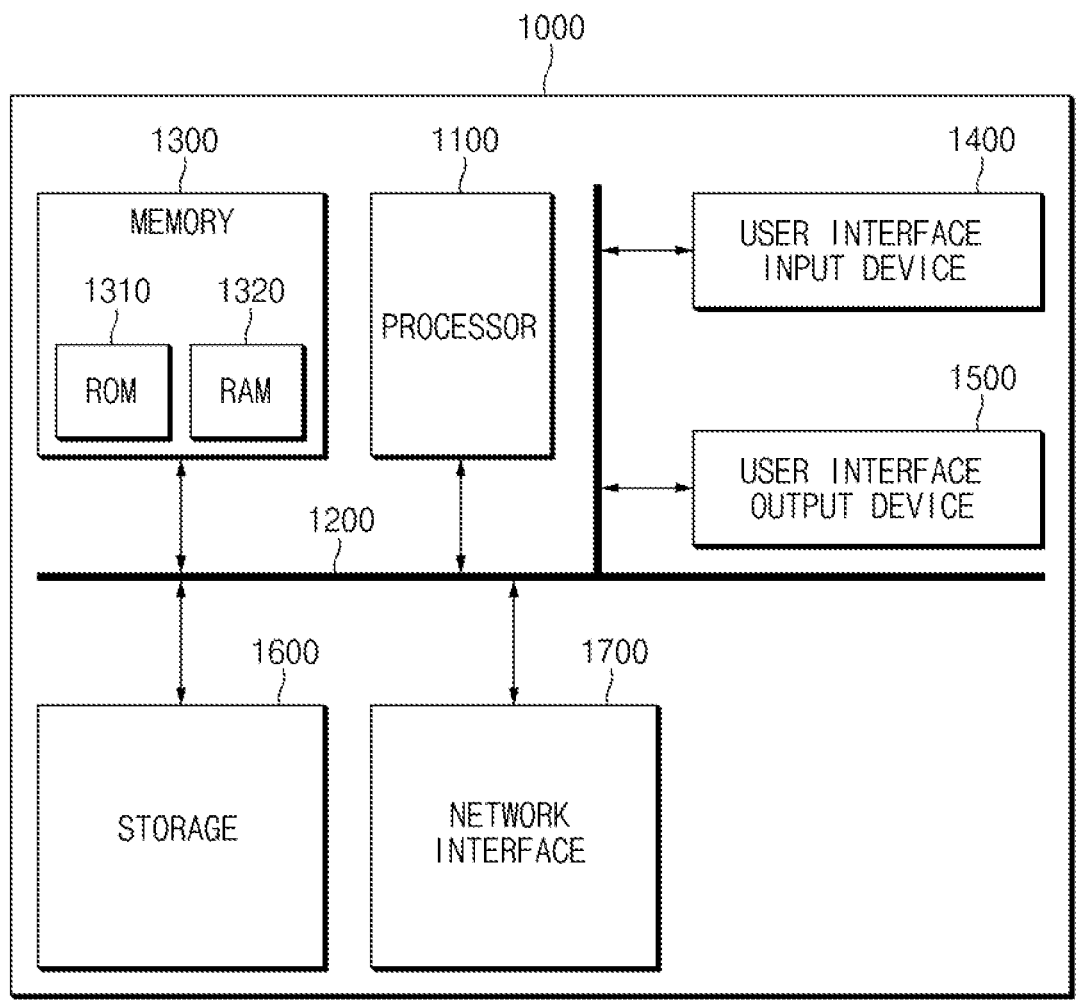
FIG. 9 illustrates a computing system.

FIG. 9 illustrates a computing system in some forms of the present disclosure.

Referring to FIG. 9, the above-described method for maneuver platooning of a vehicle may also be implemented through a computing system. A computing system 1000 may include at least one processor 1100, a memory 1300, a user interface input device 1400, a user interface output device 1500, storage 1600, and a network interface 1700 that are connected together through a system bus 1200.

The processor 1100 may be a semiconductor device that executes instructions stored in a central processing unit (CPU) or the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the method or algorithm described above in some forms of the present disclosure may be directly implemented with a hardware module or a software module executed by the processor 1100, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. An exemplary storage medium may be coupled to the processor 1100, and the processor 1100 may read information from the storage medium and may record information in the storage medium. In a different way, the storage medium may be integrated with the processor 1100. The processor and the storage medium may reside in an application specific integrated circuit (ASIC). The ASIC may reside in a user terminal. In a different way, the processor and the storage medium may also reside in a user terminal as separate components.

Therefore, some forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:

1. An apparatus for maneuver platooning of a vehicle, the apparatus comprising:
   a communication circuit configured to communicate with one or more external vehicles included in a vehicle platooning group together with the vehicle;
   a filter configured to filter particulate matter generated by the vehicle; and
   a controller electrically connected with the communication circuit, wherein the controller is configured to:
      control at least one of a behavior of the vehicle or a regeneration of the filter based on information about an order of the vehicle in the vehicle platooning group when the controller determines that regenerating the filter is required;
      obtain information regarding a remaining distance to a destination of the vehicle platooning group when the controller determines that regenerating the filter is required; and
      regenerate the filter after the vehicle reaches the destination of the vehicle platooning group when the remaining distance to the destination of the vehicle platooning group is shorter than a specified value.

2. The apparatus of claim 1, wherein the filter is a diesel particulate filter (DPF).

3. The apparatus of claim 1, wherein the controller is configured to determine whether to regenerate the filter based on an amount of soot in the filter.

4. The apparatus of claim 1, wherein the apparatus further comprises:
   an engine electrically connected with the controller, wherein the controller is configured to regenerate the filter by increasing temperature in the filter using the engine.

5. The apparatus of claim 1, wherein the controller is configured to:
   notify, with the communication circuit, other vehicles in the vehicle platooning group of the regeneration of the filter when the controller determines that regenerating the filter is required;
   control the behavior of the vehicle or a behavior of an external vehicle to increase a distance between the vehicle and the external vehicle, wherein the external vehicle is a vehicle driving behind the vehicle; and
   regenerate the filter when the other vehicles in the vehicle platooning group approve the regeneration of the filter.

6. The apparatus of claim 1, wherein the controller is configured to:
   notify, with the communication circuit, the external vehicle of the regeneration of the filter when the controller determines that regenerating the filter is required and the vehicle is a leading vehicle in the vehicle platooning group; and
   regenerate the filter when the external vehicle approves the regeneration of the filter.

7. The apparatus of claim 6, wherein:
   the controller is configured to control the behavior of the vehicle or the behavior of the external vehicle to increase the distance between the vehicle and the external vehicle when the external vehicle approves the regeneration of the filter.

8. The apparatus of claim 6, wherein the controller is configured to disable the vehicle platooning group when the external vehicle does not approve the regeneration of the filter.

9. The apparatus of claim 1, wherein the controller is configured to:
   notify, with the communication circuit, the other vehicles in the vehicle platooning group of the regeneration of the filter when the controller determines that regenerating the filter is required;
   control the behavior of the vehicle such that the vehicle moves to a rear of the vehicle platooning group; and
   regenerate the filter when the other vehicles in the vehicle platooning group approve the regeneration of the filter.

10. The apparatus of claim 1, wherein the controller is configured to:
    notify, with the communication circuit, the other vehicles in the vehicle platooning group of the regeneration of the filter when the controller determines that regenerating the filter is required and the vehicle is not the leading vehicle in the vehicle platooning group;
    control the behavior of the vehicle such that the vehicle moves to the rear of the vehicle platooning group; and
    regenerate the filter when the leading vehicle approves the regeneration of the filter.

11. The apparatus of claim 10, wherein the controller is configured to disable the vehicle platooning group when the leading vehicle does not approve the regeneration of the filter.

12. The apparatus of claim 1, wherein the controller is configured to regenerate the filter when the controller determines that regenerating the filter is required and the vehicle is a trailing vehicle in the vehicle platooning group.

13. A method for maneuver platooning of a vehicle, the method comprising:
    starting vehicle platooning of a vehicle platooning group including the vehicle;
    determining whether to regenerate a filter that is included in the vehicle; and
    when it is determined that regenerating the filter is required, controlling at least one of a behavior of the vehicle or a regeneration of the filter based on information regarding an order of the vehicle in the vehicle platooning group,
    wherein controlling at least one of the behavior of the vehicle or the regeneration of the filter comprises:
       when it is determined that regenerating the filter is required, obtaining information regarding a remaining distance to a destination of the vehicle platooning group; and
       when the remaining distance to the destination of the vehicle platooning group is shorter than a specified value, regenerating the filter after the vehicle reaches the destination of the vehicle platooning group.

14. The method of claim 13, wherein determining whether to regenerate the filter comprises:
    determining whether to regenerate the filter based on an amount of soot in the filter.

15. The method of claim 13, wherein controlling at least one of the behavior of the vehicle or the regeneration of the filter comprises:
    regenerating the filter by increasing temperature in the filter.

16. The method of claim 13, wherein controlling at least one of the behavior of the vehicle or the regeneration of the filter comprises:

when it is determined that regenerating the filter is required, notifying other vehicles in the vehicle platooning group of the regeneration of the filter;

when the other vehicles in the vehicle platooning group approve the registration of the filter, controlling the behavior of the vehicle or a behavior of an external vehicle to increase a distance between the vehicle and the external vehicle, wherein the external vehicle is a vehicle driving behind the vehicle; and regenerating the filter.

17. The method of claim 13, wherein controlling at least one of the behavior of the vehicle or the regeneration of the filter comprises:

when it is determined that regenerating the filter is required, notifying the other vehicles in the vehicle platooning group of the regeneration of the filter;

when the other vehicles in the vehicle platooning group approve the registration of the filter, controlling the behavior of the vehicle such that the vehicle moves to a rear of the vehicle platooning group; and regenerating the filter.

18. The method of claim 13, wherein controlling at least one of the behavior of the vehicle or the regeneration of the filter comprises:

when it is determined that regenerating the filter is required and the vehicle is a trailing vehicle in the vehicle platooning group, regenerating the filter.

* * * * *